United States Patent Office 3,435,046
Patented Mar. 25, 1969

3,435,046
TRIALKYL-SILYL ETHERS OF N-CARBOXY ANHYDRIDES OF MONOHYDROXY α-AMINO ACIDS AND PROCESSES FOR PREPARING THEM
Erwin F. Schoenewaldt, Watchung, N.J., assignor to Merck & Co., Inc., Rahway, N.J., a corporation of New Jersey
No Drawing. Filed Oct. 24, 1965, Ser. No. 504,978
Int. Cl. C07f 7/02; C07d 103/02
U.S. Cl. 260—307       7 Claims This invention is concerned with novel derivatives of hydroxylated amino acids. More particularly it is concerned with O-tri-alkylsilyl derivatives of N-carboxy anhydrides of hydroxylated α-amino acids such as serine, threonine, hydroxyproline and tyrosine. These compounds are useful in the synthesis of heteropepetides and other proteinaceous materials containing such amino acids.

The controlled, stepwise synthesis of heteropeptides is a problem which has long challenged the art. Such products are useful as stepping stones in the synthesis of proteins. Some of them are therapeutically active. They are also useful in the study and analysis of proteins, especially in studies designed to gain insight into the mode of action of enzymes, hormones and other proteins with important functions in the body.

Controlled stepwise synthesis of heteropeptides and proteins may be effected by reacting an amino acid such as glycine or a peptide, for example a tetrapeptide, in an aqueous medium under controlled conditions of concentration, temperature, time and hydrogen ion concentration with an N-carboxy amino acid anhydride to form an N-carboxy peptide which is then decarboxylated, suitably at a low pH to produce the desired product. The procedure may be carried out without isolation of intermediates so that heteropeptides of extremely high molecular weight containing a number of different amino acids can be prepared in the same reaction medium. The process as applied to products prepared in this invention is fully illustrated in the examples.

Generally speaking the process comprises reaction of an N-carboxy amino acid anhydride with the amino group of a second amino acid or peptide under conditions such that the only amino group present in appreciable concentration in reactive form during the course of the reaction is the amino group which is to participate in the reaction. The coupling reaction normally takes place under alkaline conditions, usually at a pH of from about 9 to 11, although significantly higher hydrogen ion concentrations can be used in many coupling reactions. The intermediate N-carboxy anhydride is then decarboxylated, usually by lowering the pH to from about 3 to 5.

Functional groups other than the α-amino group on a reactant can interfere with the course of reaction and significantly decrease the yield by the production of undesirable byproducts. Thus, for example, N-carboxy amino acid anhydrides with active hydrogen atoms, such as the hydrogen atom of amino or hydroxyl groups can react with each other to remove significant quantities of anhydride from the reaction medium and thereby decrease the overall yield. Hydroxyl groups such as those of serine, hydroxyproline, threonine, tyrosine, 3,5-dibromotyrosine, β-phenyiserine, β-hydroxyleucine and others containing aliphatic or aromatic hydroxyl groups are especially troublesome in this respect.

Blocking groups such as the benzyl radical can be used to prevent this reaction. Thus, for example, the O-benzyl N-carboxy anhydride of serine can react with phenylalanine under the above described conditions to produce O-benzyl-serylphenylalanine. It is, however, necessary to remove the benzyl group from this compound to produce the pure dipeptide. This introduces another step in the reaction sequence, and results in undesirable diminution in the yield of unblocked dipeptide.

It has now been discovered that it is possible to avoid the necessity of this extra step by blocking active hydrogen atoms with a group which is removed during the course of the coupling reaction, and, in accordance with this invention, hydroxyl groups on hydroxylated amino acids are blocked with tri-alkyl silyl groups, preferably tri-lower alkyl silyl groups such as the trimethyl silyl group. It has been found that these groups are spontaneously and concurrently released during the coupling reaction. The O-tri-alkyl silyl N-carboxy amino acid anhydrides are novel compounds and are included within the scope of this invention.

To prepare the novel compounds of this invention a tri-alkyl silyl halide, suitably the chloride or the bromide is reacted with the selected hydroxylated N-carboxy amino acid anhydride at a low temperature in the presence of an organic base.

The reaction can be represented by the following equation showing, by way of example, the preparation of O-trimethylsilyl N-carboxy serine anhydride.

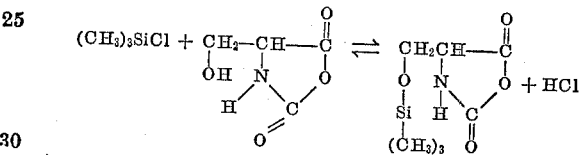

As shown, the reaction is a reversible reaction, and the equilibrium is such that the equilibrium mixture normally contains large quantities of starting materials. The reaction may be forced to the production of the trimethylsiloxy compound by the presence of a base which will neutralize the halogen acid as it forms. Preferably the salt formed will be insoluble in the reaction mixture so that it can be removed by filtration. It is most unexpected that the reaction will proceed in this manner since, it is well known that N-carboxy amino acid anhydrides rapidly polymerize in the presence of even traces of alkali, especially in organic solvents. For this reason weak organic bases, especially nitrogeneous base with a tertiary nitrogen atom such as pyridine, lutidine, collidine, and tri-lower alkyl amines suh as trimethylamine or triethylamine are employed. An especially preferred weak base is 4-methyl thiazole.

With bases such as pyridine having a pK value of 5.2 or higher the basic reagent is added after the main reactants have been mixed. The base should be added with good mixing to avoid local excesses of base which could initiate polymerization of the anhydride. Only sufficient base is employed to neutralize the acid which forms. With weak bases having pK values of about 2.9 such as 4-methyl thiazole, the base may be mixed with the other reactants at any time.

Excess tri-alkyl halide can be used as a solvent, provided it is liquid at the reaction temperature, but it is preferred to use a reaction inert organic solvent as the reaction medium. Any of a number of solvents can be employed including oxygenated solvents especially ethers such as tetrahydrofuran, dioxane, ethyl or butyl ether; or hydrocarbon solvents, especially aromatic solvents such as benzene or toluene.

The reaction is carried out at a low temperature, for example from about −5° C. to about 5° C. It is generally complete in a relatively short time, for example from about 15 minutes to one hour, depending upon the quantities of reactants utilized.

Usually equimolar quantities of the reactants will be used to avoid contamination of the desired product. However, a slight molar excess, for example up to 5% molar excess of either reactant can be employed without adversely affecting the product.

While especially useful for the preparation of derivatives of those amino acids normally found in association with animal tissue such as serine, threonine, hydroxyproline, tyrosine and the halogen derivatives of tyrosine such as 3,5-dibromo- or 3,5-diiodotyrosine the reaction is not so limited. It may with equal facility be used to prepare analogous derivatives of "unnatural" amino acids such as β-hydroxyleucine, α-hydroxynorvaline, ε-hydroxynorvaline and others.

The products prepared can be used in the preparation of a wide variety of heteropeptides in accordance with the procedures illustrated in the examples. If desired, they can also be used in the preparation of high molecular weight homopolymers such as polyserine and polythreonine by polymerization in an organic solvent in the presence of a base. Such polymeric compounds are widely employed as model compounds in the study of the physical properties of protein like structures.

The following non-limiting examples are given by way of illustration only. They illustrate the preparation of certain of the novel compounds of this invention and the use of such compounds in the preparation of certain of the novel compounds of this invention and the use of such compounds in the preparation of heteropeptides with spontaneous release of the tri-alkyl silyl blocking group. Unless otherwise indicated all amino acids are L-amino acids. The reactions do not affect the symmetry of the molecule.

EXAMPLE 1

O-trimethylsilyl threonine N-carboxy anhydride

A total of 4.5 ml. (35.1 mM.) of trimethylchlorosilane is slowly added to 5.1 g. (35. mM.) of threonine N-carboxy anhydride in 65 ml. of dry tetrahydrofuran under nitrogen while maintaining the temperature at about 2° C. To this solution there is slowly added 2.98 ml. (34 mM.) of dry 4-methyl-thiazole. The hydrochloride salt of the base precipitates out of solution during the addition. The reaction mixture is then allowed to come to room temperature and the precipitate removed by filtration under nitrogen pressure. The solvent is removed from the filtrate under reduced pressure and the residue taken up in 35 ml. of ethyl acetate and stored at about 10° C. for 16 hours. The supernatant solution is then decanted and the solvent removed under vacuum. The product which precipitates is crystallized by trituration with hexane and recovered by filtration under nitrogen pressure.

O-triethylsilyl threonine N-carboxy anhydride, O-tripropylsilyl threonine N-carboxy anhydride, O-tri-n-butylsilyl threonine N-carboxy anhydride are similarly prepared from threonine N-carboxy anhydride starting with triethylchlorosilane, tripropylbromosilane, tri-n-butyl-bromosilane, respectively. The corresponding O-threonine derivatives are similarly prepared.

EXAMPLE 2

O-trimethylsilyl serine N-carboxy anhydride

A total of 3.68 (26.8 mM.) ml. of trimethylchlorosilane is added under nitrogen to 3.75 g. (28.6 mM.) of serine-N-carboxy anhydride in 65 ml. of dry tetrahydrofuran while maintaining the temperature at about 0° C. To the mixture there is added 2.51 ml. (28.6 mM.) of anhydrous 4-methyl-thiazole at the same temperature. The reaction mixture is allowed to stand until it comes to room temperature and then stirred for two hours. It is filtered and the filtrate concentrated under vacuum to leave an oily residue which is taken up in 30 ml. of ethyl acetate. One hundred ml. of hexane is added rapidly, the mixture allowed to stand at room temperature for two hours and the supernatant decanted. The decant is concentrated to dryness, the residual product is purified by taking up in hexane, filtering, and then washing with additional hexane.

O-triethylsilyl serine N-carboxy anhydride, O-tripropylsilyl serine N-carboxy anhydride and O-tri-n-hexylsilyl serine N-carboxy anhydride are similarly prepared from serine N-carboxy anhydride and triethylchlorosilane, tripropylbromosilane and tri-n-hexylchlorosilane respectively. O-trimethylsilyl hydroxyproline N-carboxy anhydride is similarly prepared utilizing hydroxyproline N-carboxy anhydride and trimethylchlorosilane as starting materials.

EXAMPLE 3

O-trimethylsilyl tyrosine N-carboxy anhydride

A total of 7.36 ml. (53.6 mM.) of trimethylchlorosilane is added to 11.2 g. (53.6 mM.) of tyrosine-N-carboxy anhydride in 100 ml. of dry ethyl acetate containing 1.89 ml. (53.6 mM.) of 4-methyl thiazole at −5° C. The reaction mixture is allowed to come to room temperature with stirring and held for one hour. It is filtered, concentrated under reduced pressure and the product recovered in accordance with the procedure of Example 2.

O-trimethylsilyl 3,5-dibromotyrosine N-carboxy anhydride and O-trimethylsilyl 3,5-diiodotyrosine N-carboxy anhydride are similarly prepared starting with the N-carboxy anhydride of 3,5 dibromotyrosine and 3,5-diiodotyrosine respectively.

EXAMPLE 4

O-trimethylsilyl β-phenylserine N-carboxy anhydride

A total of 4.5 ml. (35.1 mM.) of trimethylchlorosilane is added under nitrogen to 10.9 (35.1 mM.) of β-phenylserine in 150 ml. of benzene while maintaining the temperature at about 5° C. with rapid stirring. To this mixture is added 2.84 ml. (35.1 mM.) of pyridine at the same temperature with continued stirring. The reaction mixture is allowed to come to room temperature and filtered. The filtrate is concentrated and the residue taken up in 50 ml. of ether. The mixture is stored for 20 hours at about 10° C., the supernatant removed and concentrated at reduced pressure to precipitate the desired product which is purified by trituration with hexane and recovered by filtration.

O-trimethylsilyl β-hydroxyleucine carboxy anhydride, O-triethylsilyl β-hydroxyvaline N-carboxy anhydride and O-tri-n-butylsilyl α-hydroxynorvaline N-carboxy anhydride are similarly prepared starting with the appropriate tri-lower alkyl-chloro silane and β-hydroxyleucine, β-hydroxyvaline and α-hydroxynorvaline respectively. The same products are similarly prepared from the same starting materials but replacing the pyridine with an equivalent quantity of triethylamine.

EXAMPLE 5

Threonyl-phenylalanine

A solution containing 145 mg. of phenylalanine in 10 ml. of water and 10 ml. of 0.9 M boric acid in a blender is adjusted to pH 10.5 with 50% aqueous sodium hydroxide and 326 mg. of O-trimethyl threonine N-carboxy anhydride is added portionwise over a period of about three minutes under nitrogen with rapid stirring. The mixture is kept at about 5° C., and the pH is maintained constant by the dropwise addition of a total of 0.75 ml. of 2.5 N aqueous sodium hydroxide during the reaction period. The pH is then reduced to 3 by the addition of sulfuric acid. The temperature is allowed to increase to about 30° C. and the mixture held for 5 minutes to effect decarboxylation.

A small sample of the reaction mixture is subjected to paper electrophoresis at pH 9.5 in 0.1 molar sodium tetraborate at 600 volts for 3 hours and threonyl-phenylalanine identified by comparison of its mobility with an authentic sample of the product under identical conditions.

The balance of the reaction mixture is adjusted to pH 6.5 with 2.5 N aqueous hydrochloric acid and freeze dried. The residue is extracted with methanol, filtered and the filtrate evaporated to dryness. The residue is taken up in a small amount of water and filtered. The filtrate is evaporated to dryness and the residue triturated with methanol. The methanol solution is chromatographed on deactivated charcoal and eluted, first with water (nineteen 2 ml. fractions) and then with 5% acetic acid: acetone: water (47.5 ml. acetone: 47.5 ml. water: 5 ml. acetic acid). The product is obtained by combining fractions 20 through 26 each containing about 2 ml. and freeze drying.

EXAMPLE 6

Seryl-phenylalanine

A solution containing 330 mg. of phenylalanine, 10 ml. of water and 10 ml. of 0.9 molar boric acid in a blender is adjusted to pH 10.5 with 50% aqueous sodium hydroxide and 406.6 mg. of trimethylsilyl serine N-carboxy anhydride added portionwise over a period of three minutes with rapid stirring, under nitrogen while maintaining the temperature at 3° C. The pH is kept constant by the dropwise addition of a total of 0.85 ml. of 2.5 N aqueous sodium hydroxide. An aliquot is dissolved in 10:1:3 butanol-acetic acid-water and subjected to thin layer chromatography on silica gel. The product is identified by comparison of its mobility in the system with an authentic sample.

EXAMPLE 7

Threonyl-methionyl-O-benzylseryl-isoleucyl-threonine

A mixture of 10 ml. of water and 10 ml. of 0.9 molar boric acid in a blender is adjusted to pH 10 with 50% aqueous sodium hydroxide and 1.081 g. of methionyl-O-benzyl seryl-isoleucyl-threonine is added. The pH is then adjusted to 10.3 with additional aqueous sodium hydroxide and 478 mg. of trimethylsilyl threonine N-carboxy anhydride added portionwise with rapid stirring over a period of about two minutes while maintaining the temperature at about 3° C. During the addition, a total of 1 ml. of 2.5 N aqueous sodium hydroxide is added to hold a constant pH. The mixture is diluted to 5 times its volume with water, filtered, the filtrate washed, and the pH of the combined filtrate and washings adjusted to 6.7 with 50% aqueous sulfuric acid. An amorphous solid precipitates which is identified as the desired product by paper electrophoresis at pH 9.5 on 0.1 molar sodium tetraborate at 600 volts for 6.5 hours.

EXAMPLE 8

Glycyl-trosyl-leucyl-phenylalanine

A mixture of 3 mM. of phenylalanine 30 ml. of aqueous potassium borate buffer at pH 10.5 is cooled to 3° C. and 3.2 mM. of solid leucine N-carboxy anhydride added with rapid stirring. Reaction is continued for 30 seconds and the pH adjusted to 3 with concentrated sulfuric acid at 0° C. while passing a stream of nitrogen through the mixture. The product is not isolated.

The pH of the mixture is adjusted to 10.0 by the addition of concentrated potassium hydroxide and 3.4 mM. of triethylsilyl tyrosine N-carboxy anhydride added with rapid stirring while maintaining the temperature at approximately 0° C. Reaction is continued for one minute and the pH adjusted to 3 with sulfuric acid to effect decarboxylation. The product is not isolated.

The pH of the mixture is adjusted to 10.2 by the addition of concentrated potassium hydroxide and 3.6 mM. of glycine N-carboxy anhydride added with rapid stirring while maintaining the temperature at about 3° C. and the pH at 10.0 to 10.2 by the dropwise addition of 2.5 N sodium hydroxide. Reaction is continued for about 2 minutes and decarboxylation effected by adjusting the pH to 3.2 with sulfuric acid and allowing the mixture to come to room temperature. The mixture is allowed to stand for about one hour and clarified by filtration. The desired product is isolated by first passing the reaction mixture over a carbon column. The peptide is adsorbed and then eluted with 5% acetic acid-water. It is recovered from the eluate by freeze drying.

What is claimed is:
1. O-trimethylsilyl serine N-carboxy anhydride.
2. O-trimethylsilyl threonine N-carboxy anhydride.
3. O-trimethylsilyl tyrosine N-carboxy anhydride.
4. O-trimethylsilyl hydroxyproline N-carboxy anhydride.
5. A process for the preparation of O-trimethylsilyl serine N-carboxy anhydride which comprises mixing substantially equimolar quantities of said anhydride and trimethylchlorosilane in tetrahydrofuran, in an inert atmosphere, at a temperature of from about −5° C. to about 5° C. and thereafter adding a substantially equimolar quantity of 4-methyl thiazole.
6. A process for the preparation of O-trimethylsily threonine N-carboxy anhydride which comprises mixing substantially equimolar quantities of said anhydride and trimethylchlorosilane in tetrahydrofuran, in an inert atmosphere at a temperature of from about −5° C. to about 5° C. and thereafter adding a substantially equimolar quantity of 4-methyl thiazole.
7. A process for the preparation of O-trimethylsilyl tyrosine N-carboxy anhydride which comprises mixing substantially equimolar quantities of said anhydride and trimethyichlorosilane in tetrahydrofuran, in an inert atmosphere, at a temperature of from about −5° C. to about 5° C. and thereafter adding a substantially equimolar quantity of 4-methyl thiazole.

No references cited.

ALEX MAZEL, *Primary Examiner.*

R. J. GALLAGHER, *Assistant Examiner.*

U.S. Cl. X.R.

260—112.5